United States Patent [19]

Pulvari

[11] Patent Number: 4,731,227
[45] Date of Patent: Mar. 15, 1988

[54] POLYMERIZATION PROCESS AND APPARATUS

[76] Inventor: Charles F. Pulvari, 2014 Taylor St., Washington, D.C. 20018

[21] Appl. No.: 931,983

[22] Filed: Nov. 24, 1986

Related U.S. Application Data

[63] Continuation of Ser. No. 454,319, Dec. 29, 1982, abandoned.

[51] Int. Cl.$^4$ .............. B01J 1/12; B06B 7/00
[52] U.S. Cl. ............. 422/127; 310/369; 366/127; 422/131; 422/135; 526/72
[58] Field of Search .......... 422/127, 128, 131, 135, 422/138, 202, 208, 226; 366/127; 310/334, 336, 369, 346, 800; 526/72

[56] References Cited

U.S. PATENT DOCUMENTS

| | | | |
|---|---|---|---|
| 2,606,174 | 8/1947 | Kolthoff et al. | 422/128 X |
| 2,617,874 | 11/1952 | Lewis | 366/127 X |
| 2,645,727 | 7/1953 | Willard | 310/369 X |
| 2,673,811 | 3/1954 | Tsunoda | 366/127 X |
| 2,826,396 | 3/1958 | Murdoch, Jr. | 366/127 X |
| 2,855,526 | 10/1958 | Jones | 310/369 X |
| 2,893,707 | 7/1959 | Gulton | 366/127 X |
| 3,058,014 | 10/1962 | Camp | 310/369 X |
| 4,045,185 | 8/1977 | Azemar et al. | 422/135 |
| 4,125,574 | 11/1978 | Kastner et al. | 422/135 X |
| 4,198,376 | 4/1980 | Fournet et al. | 422/135 |
| 4,367,130 | 1/1983 | Lemelson | 422/128 X |

FOREIGN PATENT DOCUMENTS

| | | | |
|---|---|---|---|
| 472756 | 9/1937 | United Kingdom | 422/128 |
| 1015962 | 1/1966 | United Kingdom | 422/127 |

*Primary Examiner*—Barry S. Richman
*Assistant Examiner*—W. R. Johnson
*Attorney, Agent, or Firm*—Jim Zegeer

[57] ABSTRACT

A polymerization process and reactor utilizes a high power shock producing device for introducing high energy pulses shock waves to a body of constituent monomer molecules for breaking and making bonds. The high energy pulsed shock waves are generated and introduced into a body of the constituent monomerics to break the molecular bonds and create new bonding by a hollow piezoelectric shock tube mounted in an autoclave. A stirrer is operated simultaneously to stir away the new bonding sites and make them available for linkage to another monomer contained in the reactor vessel.

15 Claims, 4 Drawing Figures

POLYMERIZATION PROCESS AND APPARATUS

This application is a continuation of application Ser. No. 454,319, filed Dec. 29, 1982, now abandoned.

BACKGROUND AND BRIEF DESCRIPTION OF THE INVENTION

Polymerization is presently a widely utilized process in chemistry and consists essentially of the formation of long sequences of smaller structural units held together by covalent bonds to form large chains or macromolecules. The repeat unit of these large molecules are called monomers or monomer residue—S because atoms are eliminated from the simple monomeric unit during some polymerization processes to provide for the necessary bonding sites through which each can be linked to other monomers to form the polymer chain. The breaking and making of new bonds over a long chain is then the building process of polymers or simply to convert monomer molecules into a polymer.

Special cases of polymerization are the co-polymers and terpolymers and form quite a large family of polymers.

Although each type of polymer goes through a slightly different process, the fundamental process remains the breaking and making of bonds. Thus, if an autoclave or any device is expected to improve polymerization it needs to break and make bonds. Generally a controlled autoclave utilizes the combined interaction of temperature, pressure and in some cases catalysts.

As however the family of polymers increased the ranges of presently used temperature pressure and catalysts did not further serve all the needed polymerization ranges and an extension of operating ranges become needed. According to this invention, of the three variable parameters, manipulation of pressure was determined to be the basic mode of polymerization. In this regard, ultrasonic energy has been previously proposed for enhancing the process of polymerization. It is however well known in such devices and processes that cavitation strongly limits the possible energy transfer of ultrasonic energy to the process constituents. Another limiting factor is that with present technology, appropriate ultrasonic generators have not been developed.

The object of the present invention is to provide a novel method and apparatus for carrying out the polymerization process.

In order to overcome the shortcomings noted above, the present invention introduces a piezoelectric shock device enabling the application of much higher energies (orders of magnitude higher) for breaking and enhancing bonds of the constituent monomeric units as the polymeric chains are formed.

The above and other objects, advantages and features of the invention will become more apparent in light of the following description and accompanying drawings wherein.

Figure 4:
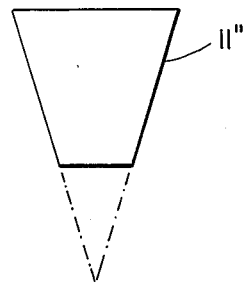

FIG. 4 diagrammatically illustrates a shape of shock tube for focussing the shock energy to a selected location.

THE HIGH POWER POLYMERIZATION REACTOR

Figure 1:
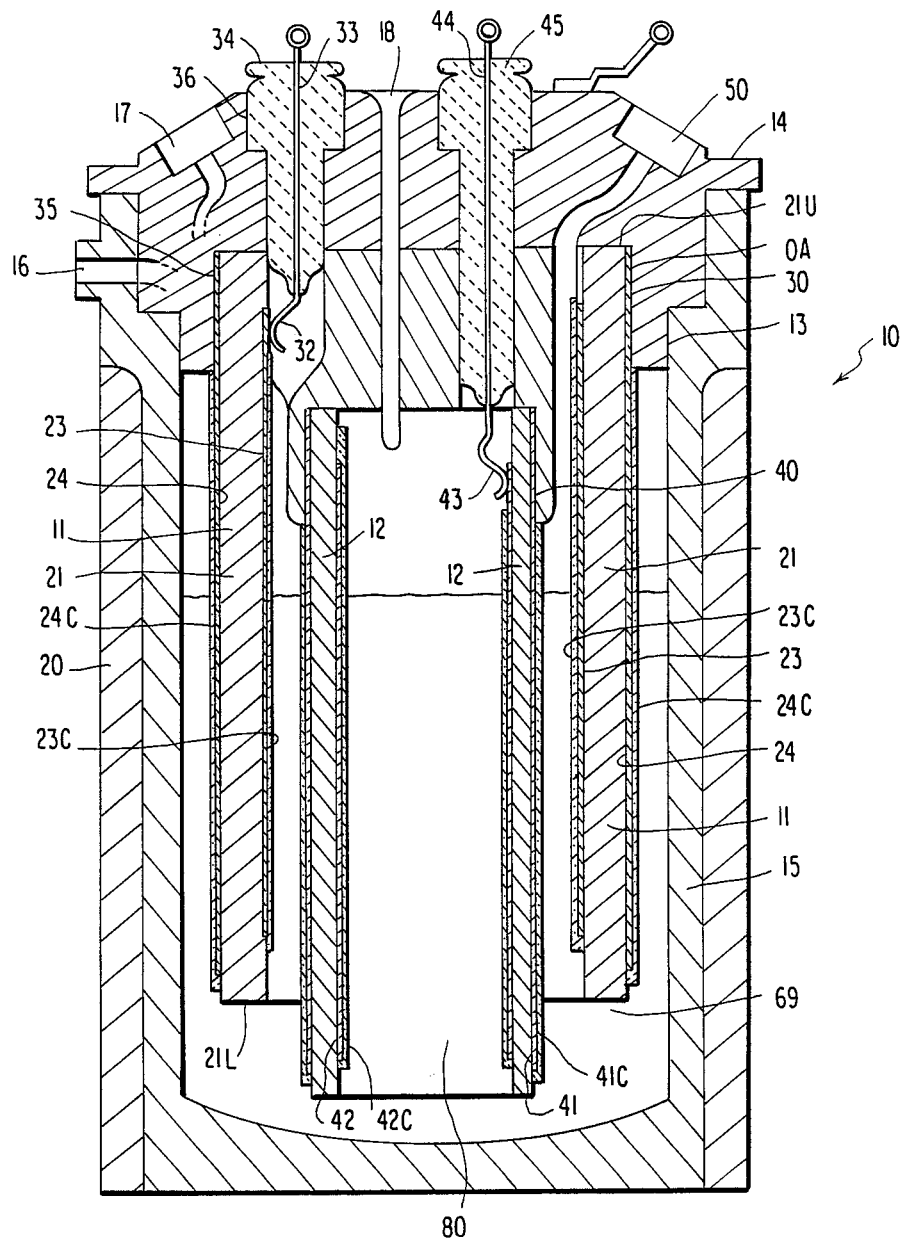
FIG. 1 is a sectional view of a polymerization reactor incorporating the invention.

FIG. 1 shows schematically the molecular reactor including autoclave 10 which, except for piezoelectric shock device 11 and stirrer 12, in this example an ultrasonic stirrer, has a heated reactor vessel 15, the various conventional autoclave control and monitoring struments such as temperature measuring thermometer means (not shown) and pressure measuring gauge means (not shown) mounted in reactor vessel cover 14 in opening 13, electrical heater 20, and various intakes 16, 17 and outlet 18 which are conventional in autoclaves. The basic operation of the reactor according to this invention, is to produce very high power (in the KW to hundreds of KW or more) shock waves by shock tube 11, capable of breaking some of the covalent and bivalent bonds of the constituent monomer ingredients placed in heated reactor vessel 15 and prepare new bonding sites which are immediately stirred by stirrer 12 so that each can be linked to other monomers to form polymer chains.

The high power shock device 11 comprises essentially of a piezoelectric body 21 having two electrodes 23, 24 so as to form a time delay and the shock tube is, in this case for example, of a hollow tubular form. Electrodes 23 and 24 can be silver or other conductor material, and a protective cover or layer, such as thin ceramic or glass layer 23C and 24C applied to protect against contaminating the monomer constituents being processed and also to electrically insulate the electrodes from the constituent monomers. Such a piezoelectric tube 11 when held on one end fixed, and is charged with a high voltage, such as for example, 10–20 KV can be discharged into the characteristic resistance of the piezoelectric time delay to thereby convert the high electrical energy in the kilowatt region into extraordinarly large pulsed shock waves appearing at the freely moving end 21L of the piezoelectric shock tube 21 capable of ionizing a material in which it is immersed.

The simultaneous breaking bonds and stirring away the so produced new bonding sites so that each is available for a new linkage to another monomer provides a very efficient exchange of bonds and as a result a very efficient polymerization occurs. The stirring is done by the ultrasonic stirrer 12 and in order to be most effective is in close proximity to the shock tube. As shown in the embodiment illustrated in FIG. 2, a mechanical stirrer is used. It will be appreciated that in some cases the mechanical shock wave can also produce a certain amount of stirring so that while independent simultaneous stirring is preferred, such is not absolutely essential and a high energy pulsed shock wave can cause the polymerization of monomer molecules in the heated reactor vessel 15. It should be noted that this efficient molecular reactor in many cases eliminates the necessity of using catalysts.

Piezoelectric shock tube 11 is supported at its upper end 21U in recess 30 of autoclave cover 14 by an conductive adhesive, mechanical or threaded fastener means and the lower end 21L is immersed in the monomer constituent 80. Annular internal electrode 23 in the upper end 21U of shock tube 11 is contacted by conductor 32 and connected to lead in 22 in insulator 34 carried in a bore 36 in autoclave cover 14. A further electrical connection is made to shock tube 21 at the outer electrode 24 at annular outer surfaces OA of upper end 21U by annular contact 35 which is in contact with the bore or recess 30 of conductive cover 14.

In this embodiment, stirring of the constituent monomers with broken covalent or bivalent bonds to prepare new bonding sites which are immediately stirred away so that each can be linked to other monomers to form polymer chains, is achieved by an ultrasonically energized piezoelectric stirrer constituted by a piezoelectric tube 12 secured in annular recess or bore 40 in autoclave cover 14, which serves as a conductor to an outer annular electrode 41. The ultrasonic excitation energy is supplied to an interior annular electrode 42 via a conductor member 43 and lead in wire 44 passing through insulator 45 in cover 14. Electrodes 41 and 42 can also be silver or other conductive material and are provided with a protective cover or layer, such as thin ceramic or glass layers 41C and 42C applied to protect against contaminating the monomer constituents and also to electrically insulate the electrodes therefrom. Conventional autoclave temperature measuring element (not shown) and conventional pressure gauge means (not shown) measures the internal temperature and pressure in the autoclave vessel 15.

After the constituent materials have been polymerized, cover 14 may be removed and the polymerized product removed. When one of the constituents is a gas or liquid to be added, it is passed through separate intake passages 16 or 17 (shown schematically), and polymerized constituent products may be removed by outlet passage 50. Heater element 20 is connected to a controlled electrical supply (not shown) whereby the internal temperature in autoclave 10 can be easily adjusted or controlled.

Piezoelectric shock tube 11, typically lead zirconate titanate (which has a high Curie point and is very strong), is from about 2 to $2\frac{1}{8}$ inches in diameter with a wall thickness of about $\frac{3}{8}$ inch. Piezoelectric stirrer 35 is of the same material and thickness, having a diameter of from about $3\frac{1}{2}$ to about 4 inches and may be proportionately shorter. In this embodiment, it is preferred that shock tube 11 be the larger diameter tube so as to safely handle the higher power, but it is to be clearly understood that one could reverse or interchange the position of shock tube 11 with stirrer tube 12, e.g. stirrer tube 12 be extended to shock tube 11 or they can even be side-by-side and not colinear or parallel.

Figure 3:
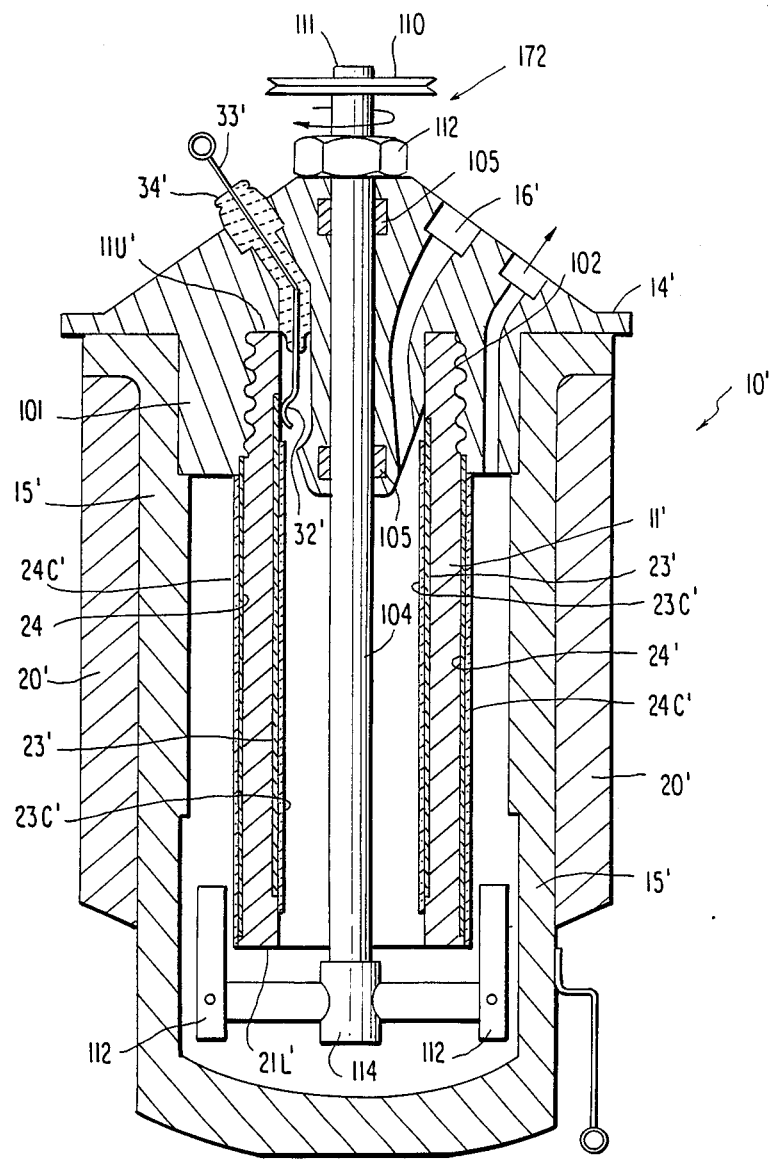
FIG. 3 is a diagrammatic illustration of the polymerization reactor of FIG. 1 showing the charging and excitation circuits for the piezoelectric shock tube and the piezoelectric stirrer, respectively.

FIG. 3 shows schematically the electrical energization system. In this illustration, the autoclave 10 is provided with shock tube 11 and piezoelectric stirrer 12 mounted therein. The high voltage power supply 60 continuously charges the tube 11 through resistor 61 and lead in conductor 33, contact 32 and annular electrode 23. Lead 60 from the high voltage supply is connected to cover 14 and the outer annular electrode 24. A thyristor 66 having a control or trigger electrode 67 for receiving a trigger pulse from control timer 68 discharges the shock tube 11 in a repetitive manner to thereby cause the shock wave, indicated at 69 to be applied to the monomer constituents. At the same time, ultrasonic energy from an ultrasonic generator 70 is supplied to piezoelectric stirrer 12 via switch 71, lead 45, contact 43 and annular electrodes 41 and 42 to produce the stirring action as the bivalent bonds are broken and prepare new bonding sites which are immediately stirred away so that each can be linked to other monomers to form polymer chains. This system provides a very efficient exchange of bonds and hence of polymerization.

EXAMPLE I

A charge of a constituent monomer such as $PVF_2$ (a fluorinated plastic which melts at about 160° C.) is placed in the heated reactor vessel 15 and the pressure raised to about 2000 atmospheres. An olefinated gas, such as 3–4 ethelyne is introduced into the vessel 15 via one of the input ports 16 or 17. Piezoelectric tube 11 is charged to about 10,000 volts. Since the tube 11 is a time delay line of about 300 ohms resistance, when this 10,000 volts is discharged through thyristor 66 over 300 KW (e.g. ($E^2/R$)) of electrical and mechanical pulse energy is produced whereby energy is applied directly to the heated monomer constituents 40 in reactor vessel 15 to prepare new molecular bonding sites in such constituent monomer. Piezoelectric stirrer 12 is simultaneously energized to stir away these new bonding sites for bonding with the gas such as fluorinated ethylene introduced through gas constituent input port 16 and-/or 17. The rate of thyristor trigger pulses from control timer 68 can be adjusted to control the rate of the electrical and mechanical pulse energy.

EXAMPLE II

As a further example, the more sophisticated use of this invention the copolymer Vinilidene Fluoride (VDF)—Trifluoroethylene (TrFE) is presented. Conventionally, in order to prepare this copolymer the addition of a catalyzator is required. When the high power polymerization reactor described herein is used, the use of an independent catalyst can be eliminated, the action of the present invention taking the place of a catalyst. In this example, 50% by weight of each constituent (VDF and TrFE) is introduced into the reactor vessel.

Figure 2:
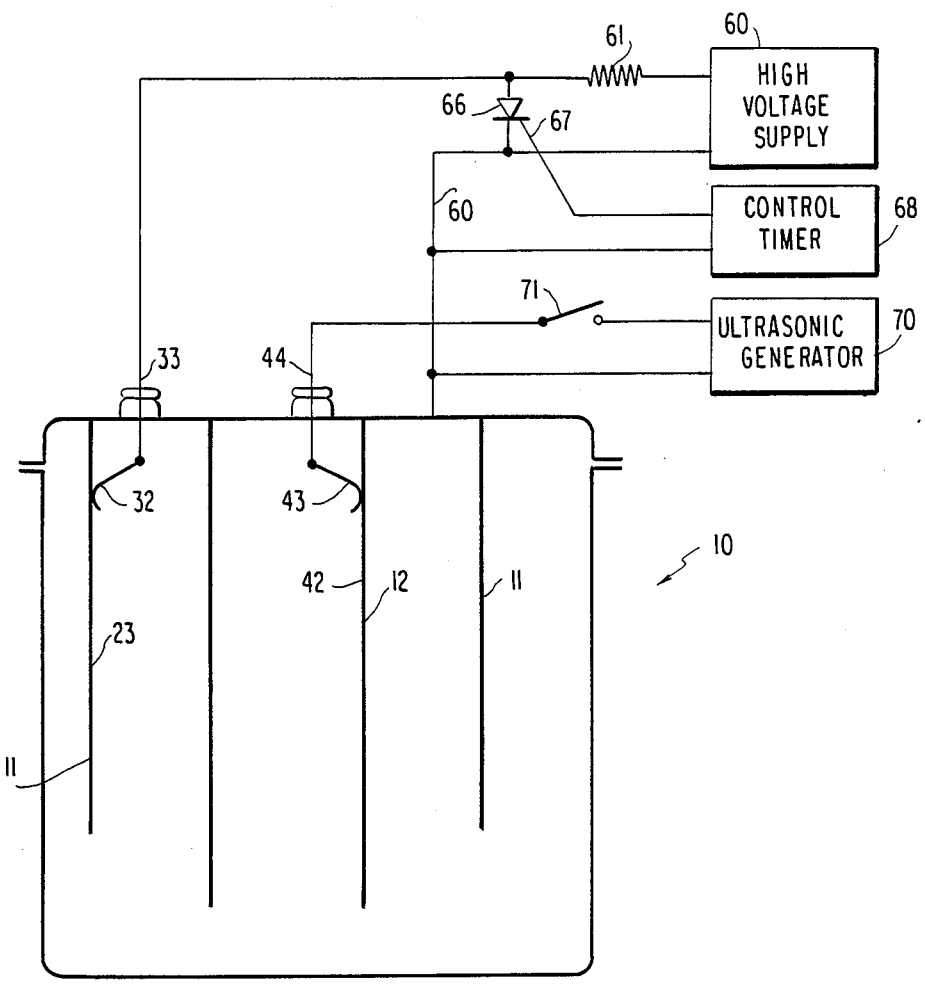
FIG. 2 is a modification of the polymerization reactor shown in FIG. 1.

In the embodiment shown in FIG. 2, piezoelectric shock tube 111 is mounted in an extension 101 of heated reactor vessel 115. Reactor vessel cover 14' has an annular bore 102 in which the upper end 111U of shock tube 111 is secured. For example, the internal surface of bore 102 is threaded to receive the correspondingly threaded and conductively coated upper end 111U of shock tube 111 so that the conductive connection to the outer surface of the shock tube to charging electrode 112 is made when the tube is mounted. It could also be secured in bore 102 by a conductive cement or soldering. A spring contact 132' contacts internal annular electrode 24' and contact 132' is connected by a lead wire 33' in insulating bushing 134, provided for the passage of lead wire 33', to the high voltage supply (shown in FIG. 2.)

Shaft 104 is journaled for rotation by bearings 105 in cover 14' by a drive means 172, in this case exemplified by a pulley 110 secured to the external end 111 of shaft 104. A gland nut 112 seals the shaft 104 in cover 14' while permitting rotation thereof.

In this embodiment, a stirring action is achieved by paddles 112 secured to the lower end 114 of shaft 104 which sealingly passes through cover 14 and sealing gland nut 112 to a drive means 172, which is diagrammatically illustrated as pulley 111, but can obviously be a direct drive motor, gearing to a motor etc., (not shown). The reactor is also provided with conventional pressure and temperature monitoring equipment (not shown). Cover 14 is also provided with a gas intake and outlet ports 16' and 18' (it being appreciated that more than one constituent input and output ports may be provided, if desired).

While the piezoelectric shock tube is shown as being vertically oriented, it will be appreciated that the shock tube may be mounted at any angle. Instead of one shock tube and one stirrer, the vessel may contain several shock tubes and stirrers and there may be more stirrers than shock tubes and vice versa, and the shock tubes need not be operated at the same power levels, nor need the stirrers by synchronously operated. Instead of being cylindrical, the shock tubes can have other shapes. For example, the shock tube could have a shape for focussing the energy to a selected location somewhat similar to shaped charge explosives. In such case, the shock tube would have a frusto-conical shape as shown in FIG. 4, where the shape of the piezoelectric shock tube is such as to focus the shock waves to a selected area, lower potentials and power may be used for charging the tube.

While I have shown and described several embodiments of my invention and ahve suggested other embodiments, it will be appreciated that other embodiments and adaptations of the invention will be readily apparent to those skilled in the art and it is intended that such other apparent modifications and adaptations of the invention may be used without departing from the spirit and scope of the invention as defined in the following claims.

What is claimed is:

1. A polymerization method comprising placing polymerizable constituent monomer molecules in an autoclave having a heated reactor vessel for receiving said constituent monomer molecules, immersing the end of a high energy piezoelectric shock producing device in said constituent monomer molecules and then electrically charging said piezoelectric shock producing device to a high voltage (E) via a pair of electrodes on said piezoelectric shock producing device, operating an discharge switch means in shunt with said pair of electrodes for periodically discharging said piezoelectric shock producing device through said electrical switch and thereby producing high energy mechanical shock waves, the energy of which are proportional to the square of said high voltage ($E^2$) and inversely proportional to the impedance (R) of said piezoelectric shock producing device, said high energy mechanical shock wave being capable of breaking some of the covalent and bivalent bonds of constituent monomer molecules in said reactor vessel.

2. The method defined in claim 1 wherein said high energy piezoelectric shock producing device is a hollow piezoelectric tube and is charged to a voltage of 10 to 20 KV.

3. The polymerization method defined in claim 1 including stirring the constituent monomer molecules after being subjected to said high energy pulsed shock waves.

4. The polymerization method defined in claim 3 wherein said stirring is performed by a piezoelectric stirrer.

5. The polymerization method defined in claim 3 wherein said stirring is performed by a mechanic stirrer immersed in the constituent monomer molecules.

6. A polymerization reactor comprising, an autoclave having a heated reactor vessel for receiving constituent monomer molecules, a high energy piezoelectric shock producing device mounted in said reactor vessel, said piezoelectric shock producing device having a pair of electrodes thereon and an impedance R, high voltage supply means connected to said pair of electrodes for electrically charging said piezoelectric shock producing device to a high voltage (E), a normally open electrical switch means connected in shunt with said pair of electrodes for periodically discharging said piezoelectric shock producing device, means for periodically operating said switch closed and thereby producing high energy non-ultrasonic mechanical shock waves in said constituent monomers only on closure of said switch and the discharge of said high voltage, said high energy mechanical shock wave being proportional to the square of said high voltage ($E^2$) divided by said resistance (R) and being capable of breaking some of the covalent and bivalent bonds of constituent monomer molecules in said reactor vessel.

7. The polymerization reactor defined in claim 6 including an impedance means in circuit between said high voltage supply means and said piezoelectric shock producing device.

8. The polymerization reactor defined in claim 6 wherein said high energy piezoelectric shock producing device is a hollow piezoelectric tube.

9. The polymerization reactor defined in claim 6 including means for stirring the constituent monomer molecules after being subjected to said high energy pulsed shock waves.

10. The polymerization reactor defined in claim 6 wherein said means for stirring includes a piezoelectric stirrer.

11. The polymerization reactor defined in claim 6 wherein said means for stirring includes a mechanical stirrer immersed in the constituent monomer molecules.

12. A high power polymerization reactor comprising a reactor vessel for receiving constituent monomers, a piezoelectric shock element in said vessel, a pair of electrodes on said piezoelectric shock element, a high voltage source, a resistor element coupling said high voltage source to said pair of electrodes for automatically charging said piezoelectric shock element to a high voltage (E), switch means connected in parallel with said pair of electrode for repeated discharge of the charged piezoelectric shock element to produce repeated non-ultrasonic mechanical shock waves, respectively, which, in turn, break some of the bonds and prepare new bonding sites in said constituent monomers.

13. The reactor defined in claim 12 wherein said piezoelectric shock element is a hollow tube and has a free end in said constituent monomer and the opposite end rigidly affixed to said reactor vessel.

14. The reactor defined in claim 13 including means for stirring the so produced new bonding sites away from where they are produced in said reactor vessel so that each can be linked to other monomers to form polymer chains.

15. A polymerization reactor comprising,
an autoclave having a heated reactor vessel for receiving constituent monomer molecules,
piezoelectric shock producing device having one end mounted on a wall of said reactor vessel and another end adapted to be immersed in said constituent monomers, said piezoelectric mechanical shock wave producing device having a pair of electrodes thereon,
a high voltage charging circuit for said piezoelectric mechanical shock wave producing device, said high voltage charging circuit comprising a high voltage supply connected to said pair of electrodes through a resistance element for electrically charging said piezoelectric shock producing device to a high voltage, electrica switch means connected between said pair of electrodes, control means for periodically closing said switch to directly connect said electrodes together and periodically discharge said piezoelectric shock producing device and thereby produce high energy mechanical shock waves in said constituent monomers only when said electrical switch means is closed to directly connect said electrodes together and discharge said piezoelectric shock producing device, said high energy non-ultrasonic mechanical shock wave being capable of breaking some of the covalent and bivalent bonds of constituent monomer molecules in said reactor vessel.

* * * * *